May 22, 1923.
H. C. UTTECH
PULLEY ATTACHMENT FOR TRACTORS
Filed Aug. 25, 1921
1,456,160
2 Sheets-Sheet 1
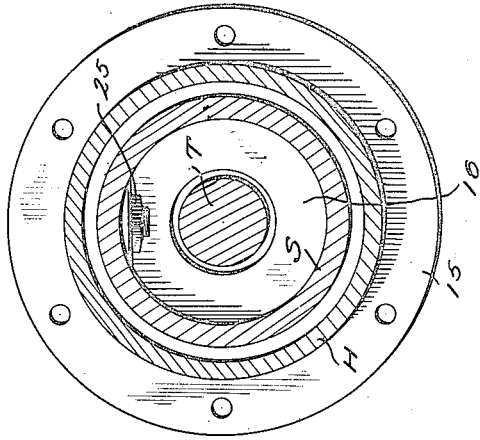
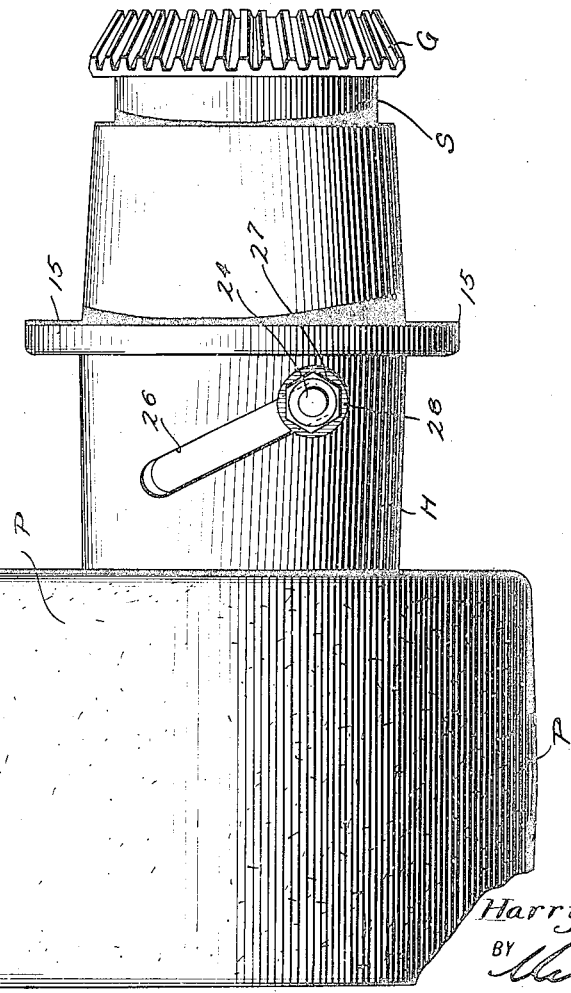
WITNESSES
INVENTOR
Harry C. Uttech
BY
ATTORNEYS

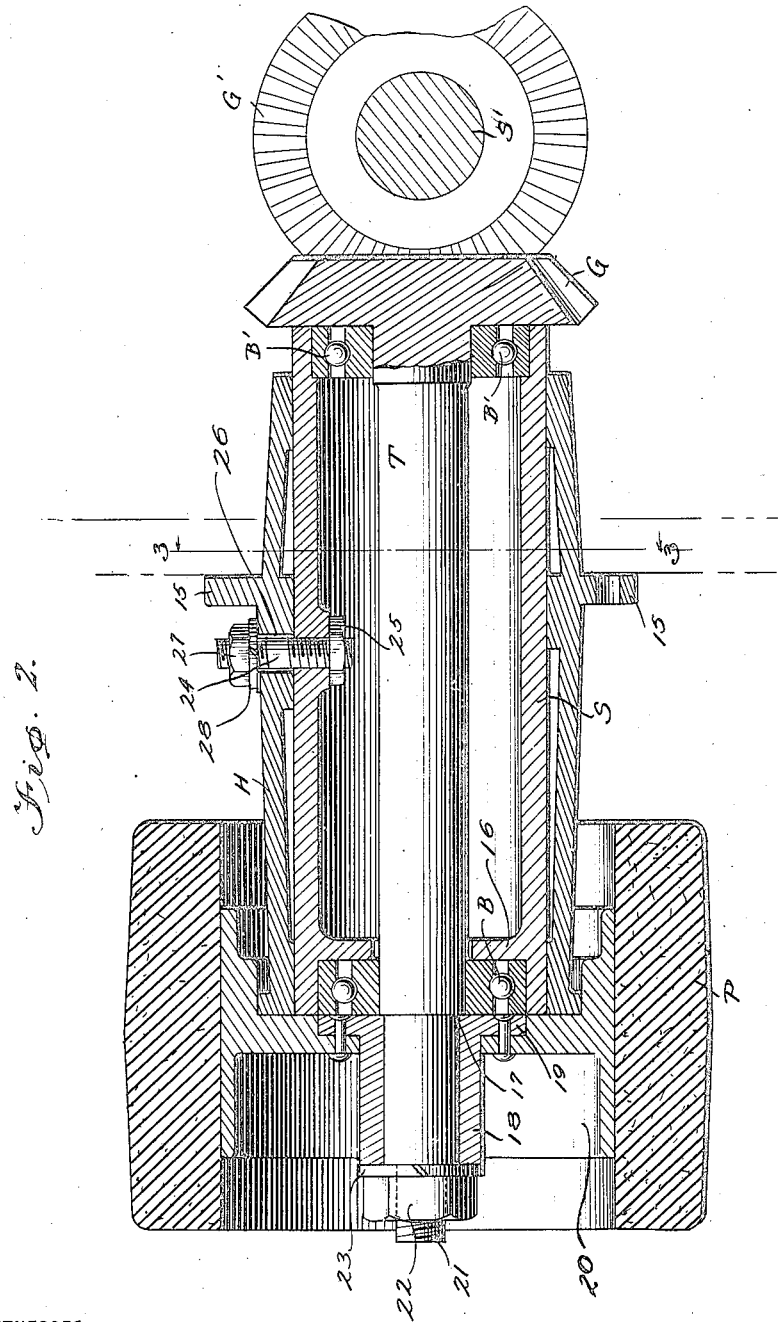

Patented May 22, 1923.

1,456,160

UNITED STATES PATENT OFFICE.

HENRY C. UTTECH, OF LEBANON, WISCONSIN.

PULLEY ATTACHMENT FOR TRACTORS.

Application filed August 25, 1921. Serial No. 495,228.

*To all whom it may concern:*

Be it known that I, HENRY C. UTTECH, a citizen of the United States, and a resident of Lebanon, in the county of Dodge and State of Wisconsin, have invented certain new and useful Improvements in Pulley Attachments for Tractors, of which the following is a specification.

My invention relates to pulley attachments for tractors by means of which power from the engine of the tractor is utilized to drive a belt for operating extraneous apparatus.

The purpose of my invention is the provision of a pulley attachment of that character which includes means for connecting or disconnecting the pulley from the transmission driving shaft of the tractor without removing any of the wheels of the tractor.

My invention is particularly adapted, although not necessarily to Fordson tractors in which a pulley attachment is provided of such a nature as to necessitate the removal of one of the tractor wheels in applying the pulley or removing the same to or from the transmission driving shaft. In view of this laborious operation, the pulley attachment after having been once applied is allowed to remain in operative connection with the transmission driving shaft so that when the tractor is functioning in its original capacity, the pulley continues to be actuated and thus effects unnecessary wear on the gears and bearings comprised in the attachment. My invention is applied during the assembly of the tractor, and by virtue of its being movable and being readily connected to or disconnected from the transmission driving shaft, the necessity of removing the tractor wheel each time the attachment is connected to or disconnected from the shaft, is eliminated, and the unnecessary wear of the bearings and gears is dispensed with.

I will describe one form of pulley attachment embodying my invention and will then point out the novel features thereof in claim.

In the accompanying drawings:

Figure 1 is a view showing in side elevation one form of pulley attachment embodying my invention.

Figure 2 is a longitudinal sectional view of the attachment shown in Figure 1 and operatively connected to the transmission driving shaft of a tractor.

Figure 3 is a transverse sectional view taken on the line 3—3 of Figure 2 and looking in the direction of the arrows.

Similar reference characters refer to similar parts in each of the several views.

Referring specifically to the drawings, my invention in its present embodiment comprises a tubular housing designated at H which is provided at a point intermediate its ends with an annular flange 15 formed with bolt receiving openings for securing the attachment as a unit to the transmission housing of a tractor. The housing H sildably receives a tubular sleeve designated at S in which are arranged ball bearings B and B' that slidably receive a shaft T. The bearing B is maintained in proper position by a flange 16 formed on the inner side of the sleeve S, while the bearing B' reposes within a counter-bore formed in the sleeve. One end of the shaft S is reduced in diameter to provide a shoulder 17, and embracing this reduced portion is a collar 18 provided with a flange 19 which is bolted or otherwise secured to the hub 20 of the pulley P. The collar 18 is retained upon the shaft T by a reduced extension 21 which threadedly receives a nut 22 engaged by a lock washer 23. The opposite end of the shaft T carries a beveled gear G disposed exteriorly of the sleeve S and the housing H.

As previously mentioned, the sleeve S is capable of longitudinal movement within the housing H, and to manually effect such movement of the sleeve a pin 24 is threaded within the sleeve S and secured therein by means of a nut 25. The pin 24 projects from the periphery of the sleeve S and into and through a slot 26 formed in the housing H and disposed spirally thereof. A nut 27 is threadedly fitted upon the pin 24 so as to embrace a washer 28 for securing the pin against movement within the slot and to thereby effect a locking of the sleeve S in any adjusted position of which it is capable.

By this arrangement it will be clear that movement of the pin longitudinally within the slot effects a longitudinal shifting of the sleeve S in one direction or the other according as the pin is moved in one direction or the other.

As the shaft T is arranged to move with the slot S, and the gear G is fixed to the shaft it will be manifest that any longitudinal adjustment of the sleeve effects a corresponding adjustment of the gear.

In practice, the gear G is adapted to mesh with a similar gear G' fixed to a transmission driving shaft S' constituting a part of the transmission mechanism of a tractor. With the sleeve in the right-hand extreme position as viewed in Figure 2 the gear G is in meshing relation to the gear G'. However, when the sleeve S is shifted to the left or to the left hand extreme position, the gear G is disengaged from the gear G'. As the pulley P is locked to the shaft T, rotation of the former is effected when the gear G is meshing with the gear G', and conversely when the gear G is disengaged from the gear G' the pulley P ceases to rotate. It will therefore be seen that with the pulley attachment secured to the transmission housing by means of the flange 15, the pulley P can be operatively connected to or disconnected from the shaft S' according as the sleeve S occupies one extreme position or the other.

Although I have herein shown and described only one form of pulley attachment for tractors embodying my invention, it is to be understood that various changes and modications may be made herein without departing from the spirit of the invention or the spirit and scope of the appended claim.

What I claim is:

A pulley attachment for tractors comprising a housing having a spirally arranged slot formed therein, a sleeve loosely fitted within the housing, a pin carried by the sleeve and extending into said slot, a shaft journaled in the sleeve and movable longitudinally therewith, a pulley carried by the shaft, a gear carried by said shaft, and a nut carried by said pin and cooperable with said housing for locking the pin against movement within the slot.

HENRY C. UTTECH.